United States Patent

Ettlinger

[15] 3,639,681
[45] Feb. 1, 1972

[54] BUSHING TERMINAL GUARD
[72] Inventor: Louis F. Ettlinger, Conover, N.C.
[73] Assignee: General Electric Company
[22] Filed: Sept. 2, 1970
[21] Appl. No.: 68,888

[52] U.S. Cl. .................................... 174/138 F, 174/139
[51] Int. Cl. ........................................... H01b 17/00
[58] Field of Search ............ 174/5 R, 66, 74 A, 77 S, 138 F, 174/139, 145, 167; 339/26, 36, 91 R, 116 R, 202, 213 R

[56] References Cited

UNITED STATES PATENTS

| | | |
|---|---|---|
| 1,748,650 | 2/1930 | Hollenbeck ................ 174/138 F UX |
| 2,263,319 | 11/1941 | Treanor ........................... 174/139 |
| 2,834,829 | 5/1958 | Broverman ................... 174/138 F |
| 3,194,878 | 7/1965 | Schneiderman .............. 174/138 F |
| 3,238,291 | 3/1966 | Bosch et al. .................. 174/138 F |

*Primary Examiner*—Laramie E. Askin
*Attorney*—Francis X. Doyle, Vale P. Myles, Frank L. Neuhauser, Oscar B. Waddell and Joseph B. Forman

[57] ABSTRACT

A bushing terminal guard for a high-voltage bushing to prevent contact with the line terminal. The guard is made of a rigid plastic material and is provided with internal fingers having notches which snap in place over the bushing terminal cap. An opening is provided to receive the high-voltage line which is to be connected to the high-voltage terminal of the bushing.

2 Claims, 3 Drawing Figures

PATENTED FEB 1 1972 3,639,681

Inventor,
Louis F. Ettlinger,
by Francis K. Doyle
His Attorney.

BUSHING TERMINAL GUARD

BACKGROUND OF THE INVENTION

This invention relates to a bushing terminal guard and more particularly to a protective guard for the terminal end of a high-voltage bushing of an electrical apparatus.

In the electrical industry, it is well known to have a high-voltage bushing mounted on the cover of an electrical apparatus such as, for example, a pole-type distribution transformer. A high-voltage lead is connected to the high-voltage terminal on the upper end of the bushing. Normally, the tank of the transformer is grounded and to avoid a short circuit to ground by animals such as, for example, squirrels which may span the distance between the high-voltage terminal and the grounded tank cover, it has been the practice to provide insulating material guards for the terminal of the bushing or to insulate the cover of the transformer. Each of these known methods has generally been considered to be relatively expensive for the benefits obtained by the purchasers of the transformers or other electrical apparatus. Most of the present day terminal guards are made of relatively expensive insulating material utilizing captive screw-type devices for retaining the terminal guards in place. Insulation on the covers generally requires a specific thickness in order to provide adequate insulation. Also, as will be understood, the insulation is generally placed over the entire cover even though the need in this instance is only in the vicinity of the high-voltage terminal. There is presently a recognized need for a means for guarding the high-voltage terminal to prevent transformer failure due to short circuits between the high-voltage terminal and the tank. It is desired that such guards be provided which will give adequate protection to the transformer with a minimum of cost to the user thereof.

It is, therefore, a principal object of this invention to provide an inexpensive bushing terminal guard.

A further object of this invention is to provide a bushing terminal guard which can be readily applied to the bushing of an electrical apparatus and which will be held securely in place without the use of external screw-type connections.

A still further object of the invention is to provide a bushing terminal guard of a rigid insulating material which will not be readily damaged by animals which may be found on the covers of the electrical apparatus.

SUMMARY OF THE INVENTION

Briefly, in one form, this invention comprises a terminal guard formed of a hollow, substantially cylindrical member of electrical insulating material which is open at the bottom. The cylindrical member will receive a bushing and will be provided with a small opening at the top for receiving a high-voltage line lead. The terminal guard is made of a rigid insulating material and is provided with internal flexible fingers which will secure the guard to the top of a bushing. If desired, an opening may be provided on the side of the cylindrical guard to provide a connection for a lightning arrester.

The invention which is sought to be protected will be particularly pointed out and distinctly claimed in the claims appended hereto. However, it is believed that this invention and the manner in which its various objects and advantages are obtained as well as other objects and advantages thereof will be better understood by reference to the following detailed description of a preferred embodiment thereof, particularly when considered in the light of the accompanying drawing.

DESCRIPTION OF PREFERRED EMBODIMENT

This invention relates to a terminal guard for use on the high-voltage bushing of an electrical apparatus such as, for example, a pole-type transformer.

Figure 1:
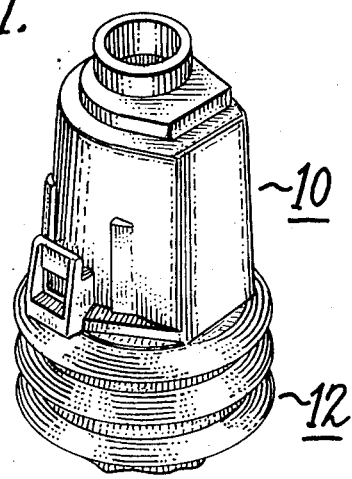
FIG. 1 is a perspective view of one form of terminal guard according to this invention.
Figure 2:
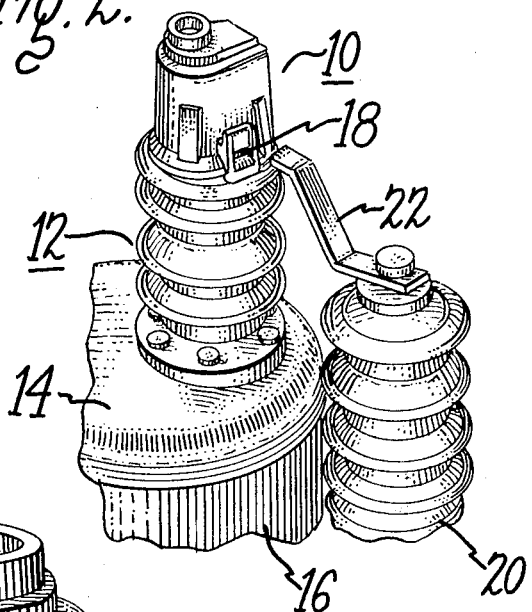
FIG. 2 is a perspective view similar to FIG. 1 showing the terminal guard with an opening for use with a lightning arrester.

Referring to the drawing in which like numerals are used to indicate like parts throughout and referring particularly to FIGS. 1 and 2, a terminal guard 10 is shown mounted on a high-voltage bushing 12. The high-voltage bushing 12 is mounted on a cover 14 of an electrical apparatus 16, only partially shown in FIG. 2. As will be understood, the bushing 12 may be secured to the cover 14 in any desired manner, for example, as by bolting or by means of a welded flange or the like.

In one form, the terminal guard 10 is provided with a slot or opening 18 as shown in FIG. 2 for use with a lightning arrester. As is shown in FIG. 2, a lightning arrester 20 has an external electrode 22 which cooperates with an electrode (not shown) which is within the terminal guard 10. As will be understood, these electrodes provide a spark gap to the lightening arrester 20 from the high-voltage terminal of the electrical apparatus. Of course, as will be understood, a direct connection from lightning arrester 20 to the high-voltage terminal on the bushing 12 may be provided through the slot 18, if desired.

Figure 3:
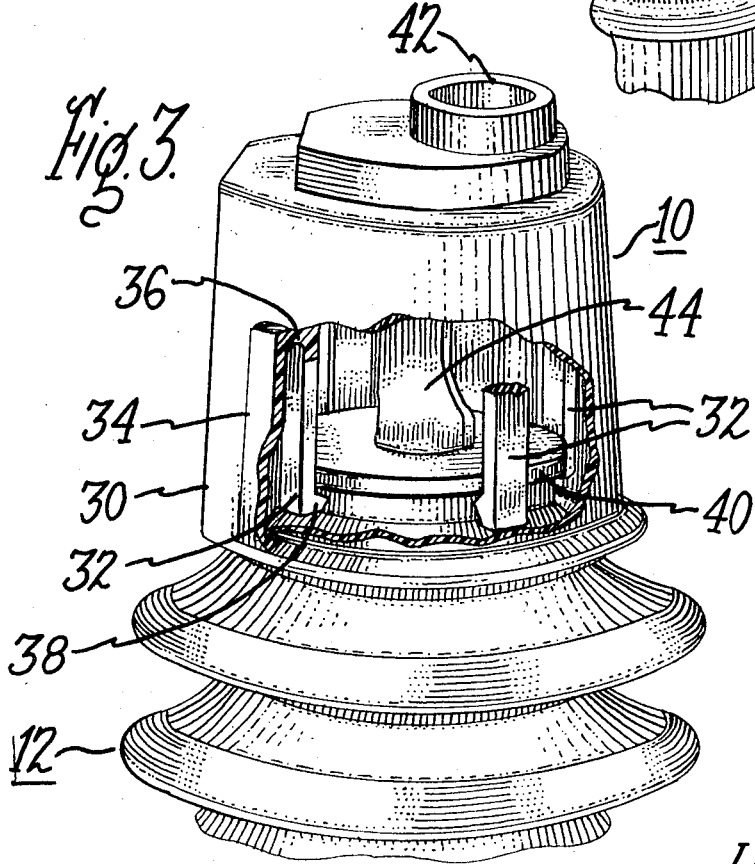
FIG. 3 is an enlarged plan view of the terminal guard of FIG. 1 with portions broken away to show the novel features of this invention.

A preferred form of the invention is shown on an enlarged scale in FIG. 3. As can be seen the guard 10 comprises a substantially cylindrical, hollow body or housing 30 formed of a rigid plastic material, such as, for example, a glass-filled polyester resin having good electrical insulating properties. The lower end of the housing is open as shown to fit over the top of the bushing 12. A plurality of fingers 32 are formed on the inner wall of housing 30 in raised portions or bosses 34 as shown. As can be seen from FIG. 3, the fingers 32 are secured to the housing 30 only at their upper ends 36. This allows the fingers 32 to flex into the bosses 34 as will be understood. The lower end of the fingers 32 are provided with notches or extensions 38 which extend into the inner portion of housing 30 and away from the inner wall of such housing. The notches or extensions 38 will snap onto the cap or upper petticoat 40 of the bushing 12 as shown. The top of the terminal guard 10 is provided with a small opening 42 to receive a high-voltage line (not shown) which will be secured to the terminal 44 of high-voltage bushing 12 in a manner well understood by those skilled in the art.

In the preferred form of the invention, the terminal guard 10 will be molded from a glass-filled polyester material. In use, the guard 10 will be slid onto the high-voltage line prior to the attaching of such line to the high-voltage terminal 44 of bushing 12. After the high-voltage line is attached to terminal 44, the guard 10 may then be slid down over the terminal 44 on top of bushing 12. As will be understood, the fingers 32 are preferably provided with angular extensions 38, as shown. The extensions 38 will cam past the cap or upper petticoat 40 of the bushing 12 and will snap under the cap 40 as is shown in FIG. 3, thus securing the terminal guard 10 in place on the top of bushing 12.

While there has been shown and described the present preferred embodiment of this invention, it will of course be understood by those skilled in the art that various changes may be made in the specific details without departing from the spirit and scope of the invention, particularly as it is set forth in the appended claims.

What is claimed as new and which it is desired to secure by Letters Patent of the United States is:

1. A bushing terminal guard comprising a substantially hollow cylindrical housing formed of rigid electrically insulating material, said housing being open at its lower end and having a small opening at its upper end for receiving a high-voltage line, a plurality of fingers formed on the inner wall of said housing, said fingers being formed with one end of each of said fingers secured to said inner wall and extending longitudinally from said one fixed end into said open lower end, each of said fingers being free at the end extending into said open lower end and said free end of each of said fingers having an extension which extends away from said inner wall and into the central portion of said open lower end.

2. A bushing terminal guard as set forth in claim 1 in which a plurality of bosses are formed around said cylindrical housing, said bosses defining recesses in said housing and each said finger having said fixed end secured to said inner wall at the top of each of said bosses, said free end of each of said fingers being adjacent one of said recesses formed by said bosses thereby allowing said free end of each of said fingers to flex within said recessed formed by said bosses.

* * * * *